June 7, 1955   W. A. HUNTER ET AL   2,710,203
ADAPTER FITTING FOR HOSE ENDS
Filed Nov. 24, 1950

INVENTORS.
William A. Hunter,
BY Walter P. Cousino.
Harness and Harris
ATTORNEYS.

United States Patent Office 2,710,203
Patented June 7, 1955

2,710,203

ADAPTER FITTING FOR HOSE ENDS

William A. Hunter, Highland Park, and Walter P. Cousino, Detroit, Mich., assignors to Chrysler Corporation, Highland Park, Mich., a corporation of Delaware Application November 24, 1950, Serial No. 197,332

2 Claims. (Cl. 285—75)

This invention relates to a hose fitting, and particularly a hose fitting of utility in connecting two flexible hoses of unequal sizes. For an example of one application of such a fitting, reference may be had to the copending application of Hunter et al. Serial No. 180,026, filed August 17, 1950, and assigned to the assignee of the present application, involving a noise filtering conduit formed of a larger expandible rubber hose fitted in series with a smaller flexible hose and carrying pressure fluid under pressures for instance of the order of 600–800 p. s. i. This application was issued on July 27, 1954, as U. S. Patent No. 2,684,692.

According to a feature of the invention, a hose fitting is provided having a minimum of length and presenting a compact appearance substantially unmarked by lateral projections and unevenness. Moreover, the fitting engages the hose substantially throughout the entire length of the fitting thereby allowing the use of a fitting shorter than present types of hose fittings without the sacrifice of adequate engagement with the hose.

According to still another feature, a hose fitting is provided in which the components exposed to fluid pressure are to all effects protected by means of the remaining components from direct external impacts and shock from outside forces.

According to yet another feature, provision is made whereby only four component parts are necessary to constitute a complete reducing fitting.

According to a further feature, there is provision made to employ threadably held, unscrewable connections in a fitting for rubber hoses and hence the fitting may be readily disassembled and the parts re-used.

According to yet a further feature, a fitting is provided expressly to effect reduction in size of a rubber hose conduit and not to provide a mere connection between parts of the same hose or the same size hose. Such a fitting of itself is considered to be novel.

Other features, objects, and advantages will either be specifically pointed out or become apparent when for a better understanding of the invention reference is made to the following specification taken in conjunction with the attached drawings in which.

Figure 1:
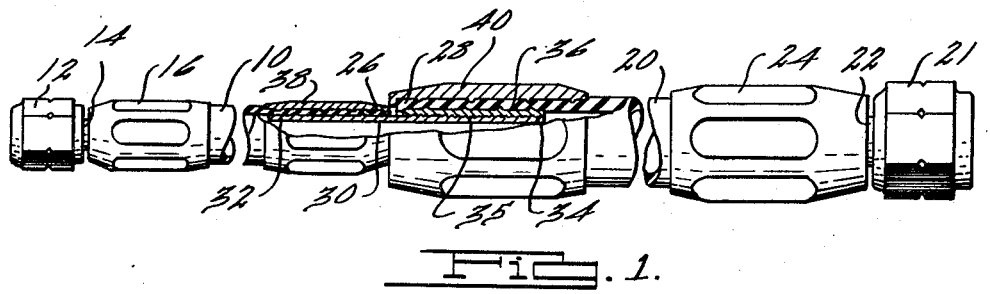
Figure 1 is a view of the reducing fitting assembly with certain parts broken away for clarity.

In Figure 1, a relatively smaller flexible hose 10 has at its outer end a conventional fitting comprising a female member 12 carried by a thimble 14 received in the hose bore. A sleeve 16 surrounds the end of the hose, the hose being effectively clamped between thimble 14 and sleeve 16. A relatively larger flexible hose 20 has at its outer end a female member 21 carried by a thimble 22. Thimble 22 is received in the bore of hose 20, and the end of hose 20 is surrounded by a sleeve 24. The inner ends 26 and 28 of the respective smaller and larger hoses are disposed in relative adjacency. A nipple 30 is mutually received in these inner ends and has threaded end portions 32 and 34 which taper in opposite directions away from one another and for purposes of identification will be referred to respectively as the ribbed end portion and the threaded end portion. Threaded end portion 34 is received by means of companion threading 35 in a nipple or thimble 36 disposed in the bore of the larger hose end 28. Sleeves 38 and 40 surround the respective ends 26 and 28 of the hoses.

Figure 2:
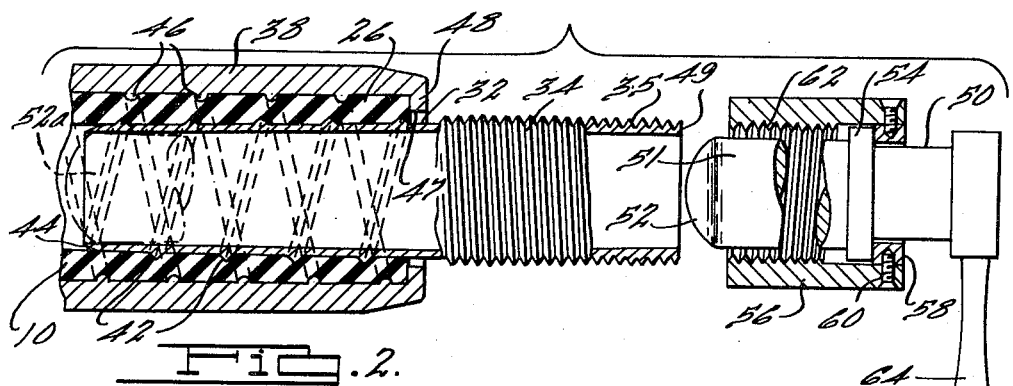
Figure 2 is a sectional view of the smaller fitting component and a tool for its assembly.

In Figure 2, end 26 of the smaller hose receives in the bore thereof the ribbed portion 32 of nipple 30 which is retained therein by means of helical ribbing 42 formed on the exterior surface of ribbed portion 32. The extremity 42 of ribbed portion 32 may be formed with the rounded contour shown. Sleeve 38 is provided with internal helical ribbing 46 which is of the opposite hand to the ribbing 42 just described, ribbing 46 being preferably of the left hand type. Sleeve 38 has an inwardly directed flange 48 defining a central opening 47. An assembly tool 50 for the fitting has a handle 64 and a shank 51 provided with the rounded nose contour 52. Shank 51 further has a shoulder forming collar 54 receiving a nut 56 therearound. Nut 56 has an inwardly directed flange member 58 suitably secured by screws 60 thereto and engageable by shoulder 54. Internal threading 62 is formed within the bore of nut 56 tapering to the right and being complementary to the threading 35 formed on threaded portion 34 of nipple 30. Threading 35 terminates in an end 49.

In the procedure for assembly of the nipple, hose end, and sleeve of Figure 2, hose end 26 is first advanced within sleeve 38 by means of the left handed ribbing 46 until hose end 26 engages the inwardly directed flange 48. Ribbing 46 is self-threading into the surface of hose end 26, which latter is composed of some elastomeric material such as rubber, neoprene, or the like. Nipple 30 may be inserted within the bore of the hose by a suitable tool, one form of which may be illustrated by tool 50. The mandrel-like shank 51 of tool 50 is inserted in nipple 30 to such a degree that rounded nose 52 assumes the advanced position 52a relative to nipple 30. The complementary threadings 35 and 62 on the respective nipple 30 and nut 56, both being right hand, permit nut 56 to be threaded along threaded portion 34 of nipple 30 to a point at which end 49 of the nipple will engage shank shoulder 54. Upon a substantial tightening of nut 56 thereafter, shoulder 54 and flange 58 will mutually jam to hold tool 50 against rotation relative to nipple 30. Then the nipple 30 and tool 50 may as a unit be advanced into the deformable bore of hose end 26 through the action of self-threading helical ribbing 42. The purpose of ribbings 46 and 42 being of opposite hand is to insure against any tendency of the hose end 26 to unscrew from sleeve 38 when nipple 30 is threaded into the bore of the hose end.

When the nipple 30 has been advanced within the bore of the hose to the location shown in Figure 2, nut 56 may be backed out of jammed engagement with shoulder 54 of the assembly tool and the shank 51 thereof slidably withdrawn from nipple 30. For the purpose of a subsequent disassembly of the fitting, a reverse order of steps is taken and since threaded fittings are used exclusively, the components are not destroyed or permanently distorted during disassembly nor prevented from being re-used a number of times.

Figure 3:
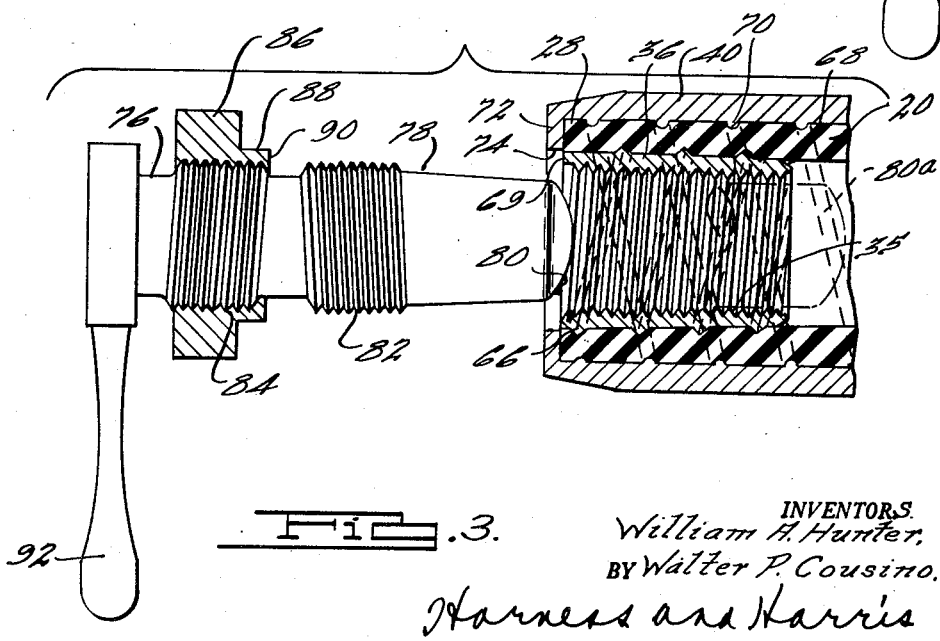
Figure 3 is a sectional view of the larger fitting component and assembly tool.

In Figure 3, the end 28 of the larger hose receives in the bore thereof a nipple or thimble 36 provided with external helical ribbing 66. End 68 of nipple 36 is rounded and the opposite or outer end is faced off at 69. Internally of nipple 36 is formed right-handed threading 35. Helical ribbing 70 of opposite hand to ribbing 66 and preferably left handed, is provided internally of sleeve 40 which has at one end thereof an inwardly directed flange 72 defining a central opening 74. An assembly tool 76 for the hose has a shank 78 formed at one end with a curved nose portion 80. At an intermediate region, shank 78 has a portion 82 threaded with right hand threads. Another portion 84 is threaded with left hand threads on which is received a nut 86 having a reduced end 88 providing a shoulder 90. Tool 76 is provided with a handle 92 for its manual operation.

Assembly procedure in Figure 3 consists first in the advancing larger hose end 28 into the sleeve 40 by means of the self-threading left handed helical ribbing 70 to a point where the hose end substantially engages the sleeve flange 72. Nipple 36 meantime is readily fitted over the tool shank 78 and threaded thereon by means of the cooperation of right hand threads 82 and 35. In assembled relation the curved nose 80 of shank 78 takes the position 80a relative to nipple 36. Nut 86 carried by left hand threads 84 is then drawn up against the end 69 of nipple 36 to produce a jam engagement with nut shoulder 90. When nut 86 is tight under those circumstances, relative rotation between shank 78 and nipple 36 is effectively prevented. Tool 76 and nipple 36 may then as a unit be inserted in the bore of end 28 of the larger hose and threadably advanced thereinto by the self-threading right handed helical ribbing 66 formed on the exterior of nipple 36.

The reduced portion 88 of nut 86 is of a small enough diameter to clear sleeve opening 74 and permit the end 69 of sleeve 36 to be forced therein. The nut 86 may then be backed out of jam engagement a fraction of a turn in order to loosen tool 76 from sleeve 36 and permit it to be threadably withdrawn therefrom by threadable disengagement of shank threads 82 and sleeve threads 35. Disassembly of the sleeve, nipple, and hose 40, 36, and 20 may be accomplished in the reverse order of operation.

After the component fittings in Figure 2 and in Figure 3 respectively are individually assembled, threaded portion 34 of nipple 30 may be threadably advanced coextensively within the internally threaded bore provided by nipple 36 and the hose ends 26 and 28, drawn together into the position of Figure 1 with sleeves 38 and 40 likewise being in relative adjacency. On final assembly, the restriction formed by nipple 30 can be seen in Figure 2 to be substantially of the same order of diameter as the bore of hose 10. It is to be observed that the fluid pressure carrying part 30 is rendered substantially unexposed, being surrounded by the hose ends and the respective outside sleeves. The part 30 is thus protected from any external impact, shocks and forces and is subjected only to the internal pressure of any fluids carried by the conduit formed of hoses 10 and 20. Finally, only four physical parts are involved to connect the smaller hose end 26 to the larger hose end 28 and even so the hoses 10 and 20 may then be disconnected and the fittings removed entirely therefrom without physical destruction or permanent deformation of the metal of any of the original parts. That is to say, the fitting parts are undeforming both in their application to a flexible hose and in their subsequent removal therefrom.

Variations within the spirit and scope of the invention described are equally comprehended by the foregoing description.

What is claimed is:

1. An undeforming reducing fitting for fluid pressure hoses of unequal sizes comprising a sleeve for the end of the smaller hose formed with helical ribbing on the inner wall thereof for urging the smaller hose therethrough when turned therein, a one-piece nipple having a first externally threaded end portion, said nipple further having an adjacent opposite end portion adapted to be received within the bore of the smaller hose when the smaller hose is disposed within the sleeve threadably retained therein and formed with helical ribbing on the outer wall thereof for urging the said nipple opposite end portion through the smaller hose when turned therein, a similar larger sleeve for the end of the larger hose, and a nipple adapted to be received in the bore of the larger hose when the larger hose is disposed in said similar sleeve threadably retained therein and formed with helical ribbing on the outer wall thereof for urging the last named nipple through the larger hose when turned therein, said last named nipple having a bore providing internal threads for threadably receiving said first externally threaded nipple end portion and permitting said sleeves to be drawn into substantial juxtaposition together.

2. The combination with relatively large and small flexible hoses having their ends disposed in relative adjacency, of an undeforming reducing fitting interposed to effect a fluid tight connection at the ends aforesaid, said fitting comprising large and small sleeves for encompassing the end of the large and small hose respectively and having helical ribbing formed on the inner walls thereof for urging the corresponding hose ends therethrough when turned therein, and large and small nipples adapted for disposition within the bores of the hoses when the same are threadably retained in the sleeves and having helical ribbing formed on external portions thereof for urging the said external portions through the corresponding hose ends, said nipples being interconnectingly provided one with an additional externally threaded portion and the other with an internally threaded mating portion mutually adapted to be threadably advanced coextensively with each other such that the actual interconnection is concealed within the bore of one said hose and the said sleeves are in substantial juxtaposition, the helical ribbing on said sleeves and on said nipples being of opposite hand.

References Cited in the file of this patent

UNITED STATES PATENTS

| 440,844 | Hallas | Nov. 18, 1890 |
| 480,247 | Caldwell | Aug. 9, 1892 |
| 572,419 | Frees | Dec. 1, 1896 |
| 969,358 | Goodall | Sept. 6, 1910 |
| 1,185,215 | Lezzeni | May 30, 1916 |
| 1,410,405 | Johnson | Mar. 21, 1922 |
| 2,029,846 | Von Henke | Feb. 4, 1936 |
| 2,468,338 | MacWilliam | Apr. 26, 1949 |

FOREIGN PATENTS

| 711,203 | France | June 23, 1931 |